United States Patent
Jones et al.

(10) Patent No.: US 8,002,323 B2
(45) Date of Patent: Aug. 23, 2011

(54) CONSOLE ASSEMBLY

(75) Inventors: Thomas A. Jones, Macomb, MI (US); Janet S. Goings, Commerce Township, MI (US); Christopher S. Hilts, Dearborn, MI (US); Adrian Bica, Markham, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/367,198

(22) Filed: Feb. 6, 2009

(65) Prior Publication Data

US 2010/0201147 A1   Aug. 12, 2010

(51) Int. Cl.
*B60N 3/12* (2006.01)
*B60R 7/00* (2006.01)

(52) U.S. Cl. .................... 296/37.1; 296/24.34

(58) Field of Classification Search ............. 296/24.34, 296/37.8, 153, 37.1, 37.16, 37.5; 224/275, 224/400, 401; 297/188.14, 188.19
See application file for complete search history.

(56) References Cited

U.S. PATENT DOCUMENTS

| | | | |
|---|---|---|---|
| 6,203,088 B1 * | 3/2001 | Fernandez et al. | 296/37.8 |
| 6,419,314 B1 | 7/2002 | Scheerhorn | |
| 6,547,323 B1 * | 4/2003 | Aitken et al. | 297/113 |
| 6,719,367 B2 * | 4/2004 | Mic et al. | 297/188.19 |
| 6,749,079 B2 | 6/2004 | Katagiri et al. | |
| 7,029,049 B2 | 4/2006 | Rockafellow et al. | |
| 7,114,772 B2 * | 10/2006 | Kobayashi et al. | 297/188.04 |
| 7,264,291 B2 * | 9/2007 | Radu et al. | 296/24.34 |
| 7,278,681 B2 * | 10/2007 | Lilov et al. | 297/188.17 |
| 7,429,068 B2 * | 9/2008 | Busha et al. | 296/24.34 |
| 2006/0208517 A1 * | 9/2006 | Nakamura et al. | 296/37.1 |
| 2007/0085363 A1 | 4/2007 | Sturt et al. | |

FOREIGN PATENT DOCUMENTS

JP    2008087732 A  *  4/2008

* cited by examiner

*Primary Examiner* — Glenn Dayoan
*Assistant Examiner* — SunSurraye Westbrook
(74) *Attorney, Agent, or Firm* — Quinn Law Group, PLLC

(57) ABSTRACT

A center console assembly for a vehicle interior compartment includes a console body defining a storage compartment characterized by an access opening. A first member is operatively connected to the console body and is selectively rotatable about a first axis between a closed position and an open position. In the closed position, the first member obstructs the access opening. In the open position, the first member does not obstruct the access opening. A second member is operatively connected to the first member such that the second member is selectively rotatable with the first member about the first axis, and such that the second member is selectively rotatable with respect to the first member about a second axis.

10 Claims, 6 Drawing Sheets

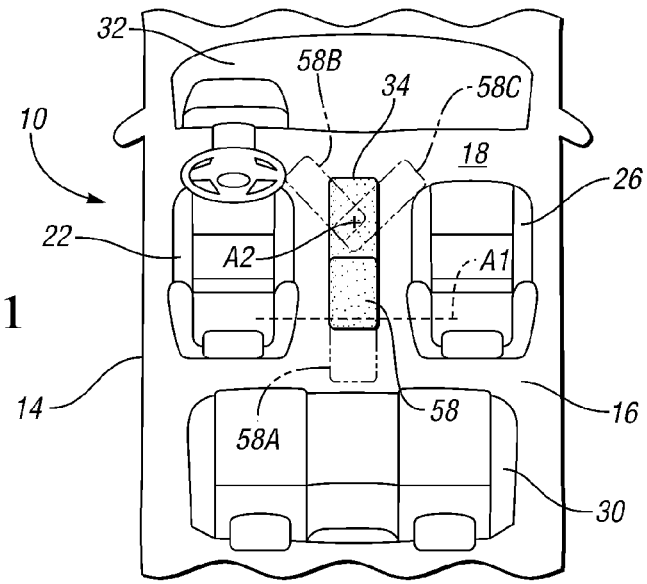
FIG. 1
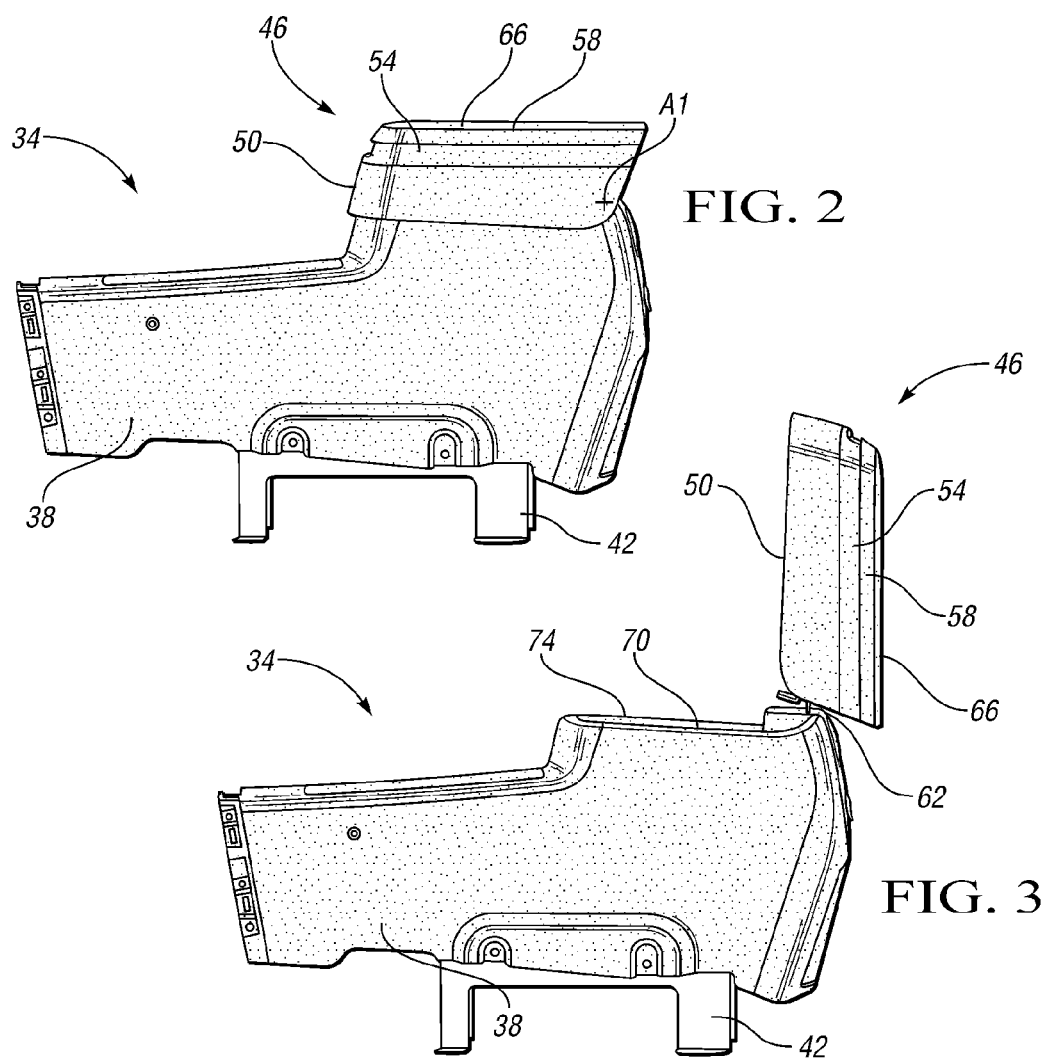
FIG. 2
FIG. 3

CONSOLE ASSEMBLY

TECHNICAL FIELD

This invention relates to console assemblies for vehicle interior compartments.

BACKGROUND OF THE INVENTION

Some vehicles include a center console positioned between a driver seat and a passenger seat. The center console defines a storage compartment with an opening through which an occupant of the vehicle can access the storage compartment. A lid selectively obstructs the storage compartment opening and may function as an armrest when the lid is in the closed position.

SUMMARY OF THE INVENTION

A center console assembly for a vehicle interior compartment includes a console body defining a storage compartment characterized by an access opening. A first member is operatively connected to the console body and is selectively rotatable about a first axis between a closed position and an open position. In the closed position, the first member obstructs the access opening. In the open position, the first member does not obstruct the access opening.

A second member is operatively connected to the first member such that the second member is selectively rotatable with the first member about the first axis, and such that the second member is selectively rotatable with respect to the first member about a second axis. The selective rotation about the second axis facilitates the use of the second member as a working surface for a front row passenger by reducing or eliminating the need for the passenger to twist the passenger's torso to use the surface.

A vehicle includes a vehicle body having a floor that partially defines a passenger compartment. First and second passenger seats are mounted with respect to the floor and are disposed within the passenger compartment. A console assembly is mounted with respect to the floor and is positioned between the first and second passenger seats. The console assembly includes a console body and an upper member that is selectively rotatable with respect to the console body about a generally vertical axis.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic, top view of an vehicle body having a console assembly mounted thereto;

FIG. 2 is a schematic, side view of the console assembly of FIG. 1, including a lid assembly in a closed position and having lower, intermediate, and upper members;

FIG. 3 is a schematic, side view of the console assembly of FIG. 2 with the lid assembly in an open position;

DESCRIPTION OF THE PREFERRED EMBODIMENTS

Figure 4:
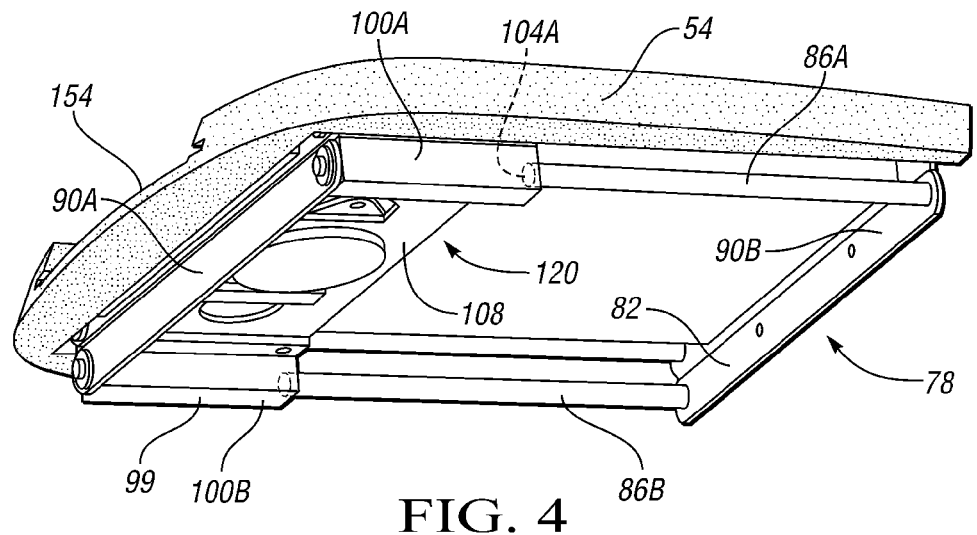
FIG. 4 is a schematic, perspective view of the intermediate member of FIG. 2 with a slide assembly attached thereto.

Referring to FIG. 1, a vehicle 10 includes a vehicle body 14. The vehicle body 14 includes a floor 16 that defines the lower surface of a passenger compartment 18. The floor 16 supports a plurality of passenger seats, including a driver seat 22, a front passenger seat 26 and rear passenger seats 30. The driver seat 22 and the front passenger seat 26 are laterally spaced apart from one another, and the rear passenger seats 30 are rearward of the driver seat 22 and the front passenger seat 26. The driver seat 22 and the passenger seat 26 are rearward of an instrument panel 32, which is disposed at the front end of the passenger compartment 18.

The floor 16 also supports a center console assembly 34 between the driver seat 22 and the front passenger seat 26. Referring to FIG. 2, wherein like reference numbers refer to like components from FIG. 1, the center console assembly 34 includes a body 38. A bracket 42 rigidly connects the body 38 of the center console assembly 34 to the floor (shown at 16 in FIG. 1). The center console assembly 34 also includes a lid assembly 46 having a first member, i.e., lower member 50, a third member, i.e., intermediate member 54, and a second member, i.e., upper member 58. The members 50, 54, 58 are operatively connected to one another. The intermediate member 54 is between, and operatively interconnects, the lower and upper members 50, 58.

Referring to FIGS. 2 and 3, the lower member 50 is rotatably mounted to the body 38 via a hinge 62 such that the lower member 50 is selectively rotatable with respect to the console body 38 about axis A1 between a closed position, as shown in FIG. 2, and an open position, as shown in FIG. 3. The intermediate and upper members 54, 58 are operatively connected to the lower member 50 such that they rotate with the lower member 50 about axis A1. Accordingly, the lid assembly 46 is rotatable about axis A1 between a closed position, as shown in FIG. 2, and an open position, as shown in FIG. 3.

When the lid assembly 46 is in the closed position, the members 50, 54, 58 are generally horizontally oriented and parallel with the floor 16. Surface 66 of member 58 is horizontally oriented and is upwardly unobstructed when the lid assembly 46 is in the closed position. Accordingly, surface 66 may function as an armrest for occupants of the driver seat 22 and the front passenger seat 26 when the lid assembly 46 is in the position shown in FIG. 2.

The body 38 of the center console assembly 34 defines a storage compartment 70 that is characterized by an access opening 74 at the top of the body 38. When the lid assembly 46 is in the closed position, as shown in FIG. 2, the lid assembly 46, and, more specifically, the lower member 50, extends across, and completely obstructs, the opening 74. When the lid assembly 46 is in the open position, the lid assembly 46 does not obstruct the opening 74, and thus the storage compartment 70 is upwardly open and accessible by an occupant of the passenger compartment via opening 74. When the lid assembly 46 is in the open position, the members 50, 54, 58 and surface 66 are vertically oriented. Axis A1 is generally horizontally oriented and, in the embodiment depicted, extends transversely across the vehicle body 14, as shown in FIG. 1.

Figure 5:
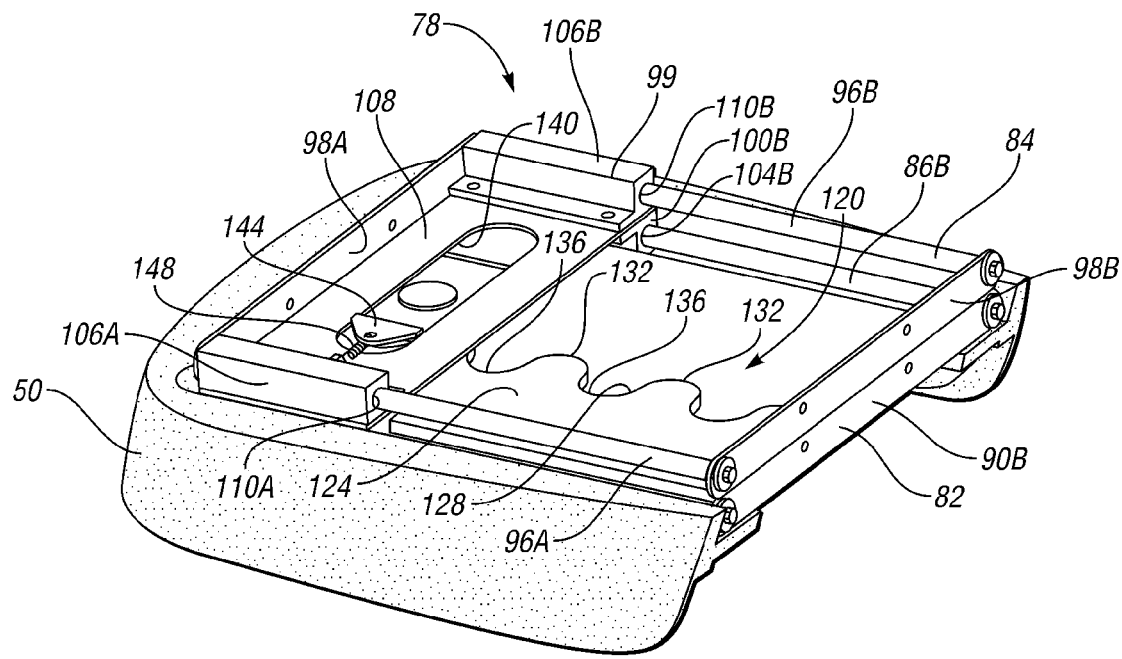
FIG. 5 is a schematic, perspective view of the lower member of FIG. 2 with the slide assembly in a first configuration.

Referring to FIGS. 4 and 5, a slide assembly 78 includes a first frame 82 and a second frame 84. The first frame 82 includes two cylindrical rails 86A, 86B. The rails 86A, 86B are parallel to one another and extend longitudinally with respect to the vehicle body 14. The frame 82 also includes two cross members 90A, 90B, which extend transversely with respect to the body 14 and which and interconnect the two rails 86A, 86B. The first frame 82 is mounted to the lower member 50.

The second frame 84 also includes two rails 96A, 96B that are parallel to one another and that extend longitudinally with respect to the vehicle body 14. The second frame 84 also includes two cross members 98A, 98B, which extend transversely with respect to the vehicle body 14 and which interconnect the two rails 96A, 96B.

The slide assembly 78 also includes a carriage assembly 99. Carriage assembly 99 includes members 100A, 100B. Each of members 100A, 100B defines a respective hole 104A, 104B through which a respective rail 86A, 86B extends. The diameter of holes 104A, 104B is slightly larger than the diameter of rails 86A, 86B so that each member 100A, 100B is slidable along a respective one of the rails 86A, 86B. Thus, members 100A, 100B are selectively translatable fore/aft along rails 86A, 86B.

Carriage assembly 99 also includes members 106A, 106B, and member 108. Member 108 rigidly interconnects members 100A, 100B and members 106A, 106B. Member 106A defines a hole 110A through which rail 96A extends. Similarly, member 106B defines a hole 110B through which rail 96B extends. Rails 96A, 96B are selectively slidable fore and aft through members 106A, 106B, respectively. Member 108 interconnects members 100A, 100B, 106A, 106B, and therefore the carriage assembly 99 is slidable as a unit along rails 86A, 86B between cross members 90A, 90B. The carriage assembly 99 is also slidable as a unit along rails 96A, 96B between cross members 98A, 98B.

Figure 6:
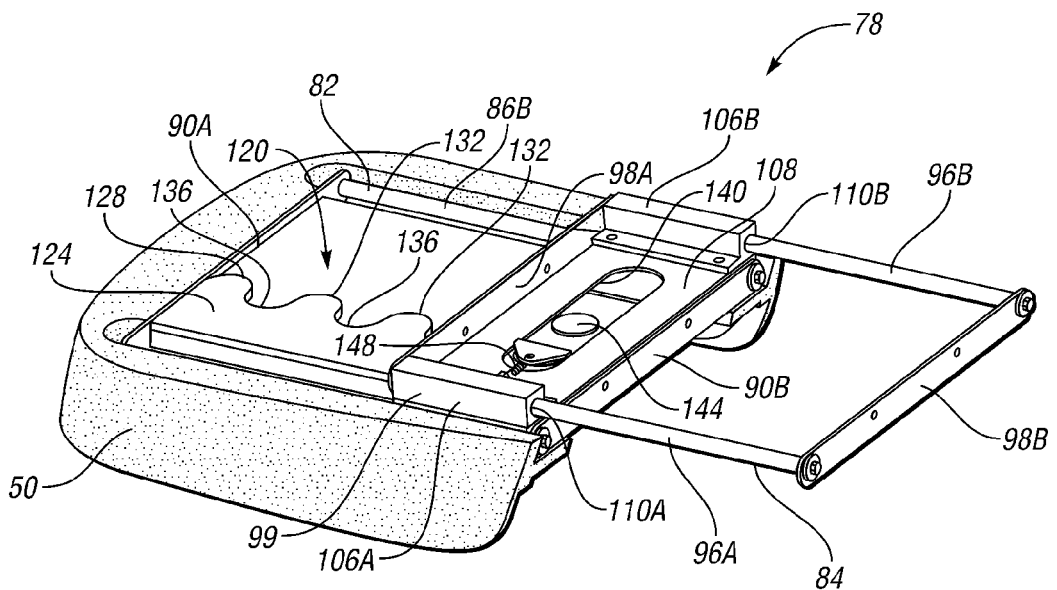
FIG. 6 is another schematic, perspective view of the lower member of FIG. 2 with the slide assembly in a second configuration.
Figure 7:
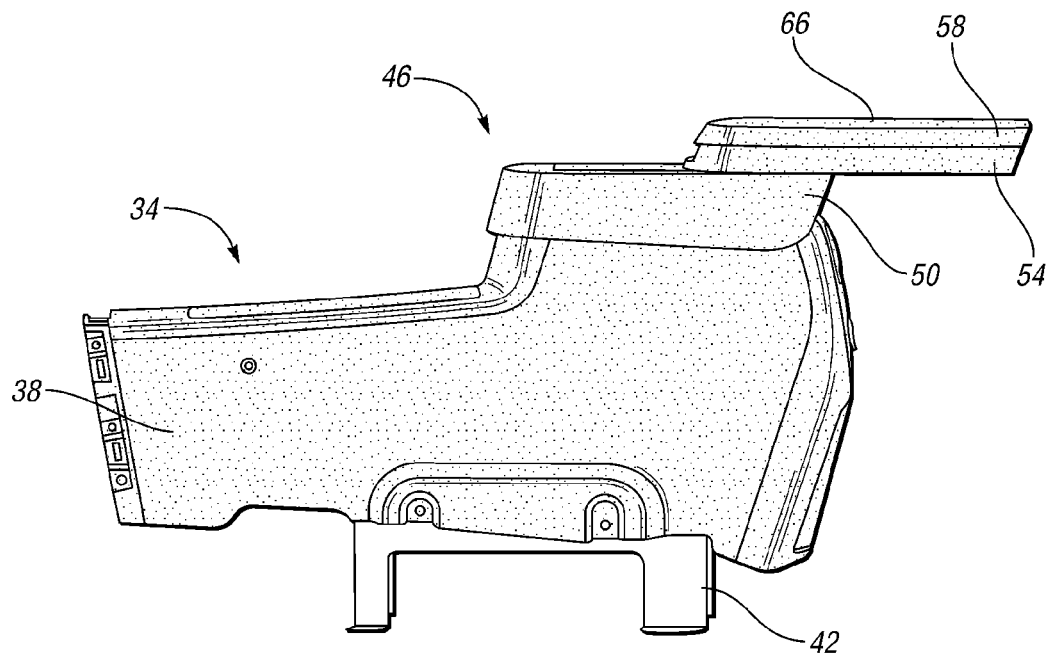
FIG. 7 is a schematic, side view of the console assembly of FIG. 2 with the intermediate and upper members in an aft position that corresponds to the slide assembly in the second configuration.

When the slide assembly 78 is in the position shown in FIGS. 4 and 5, the members 54, 58 of the lid assembly 46 are in the positions shown in FIG. 2. The slide assembly 78 guides the movement of the intermediate member 54, and therefore the upper member 58, with respect to the lower member 50 and the console body 38. More specifically, the slide assembly 78 limits the movement of the intermediate member 58 with respect to the lower member 50 to fore and aft translation. Referring to FIGS. 6 and 7, a force urging the intermediate member 54 rearward also urges the second frame 84 rearward. Cross member 98A of the second frame 84 acts on the carriage assembly 99 so that the carriage assembly 99 slides rearward along rails 86A, 86B, thereby guiding the intermediate member 54 to an aft position, as shown in FIG. 7. The upper member 58 translates with the intermediate member 54 to an aft position, as shown in FIG. 7, and as shown in phantom at 58A in FIG. 1. Cross member 90B of the first frame 82 limits rearward movement of the carriage assembly 99 and the intermediate member 54.

Figure 8:
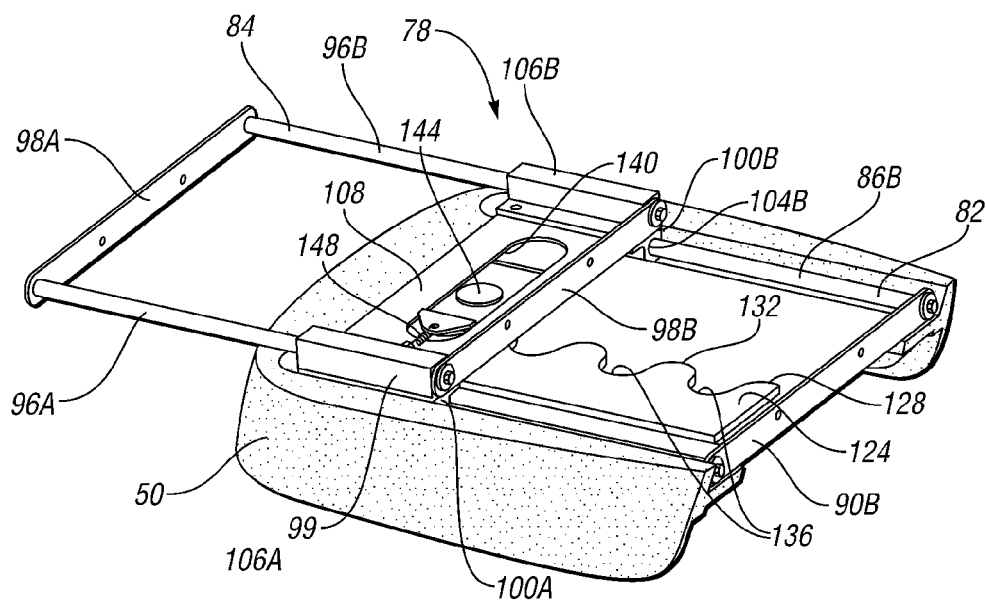
FIG. 8 is a schematic, perspective view of the lower member of FIG. 2 with the slide assembly in a third configuration.
Figure 9:
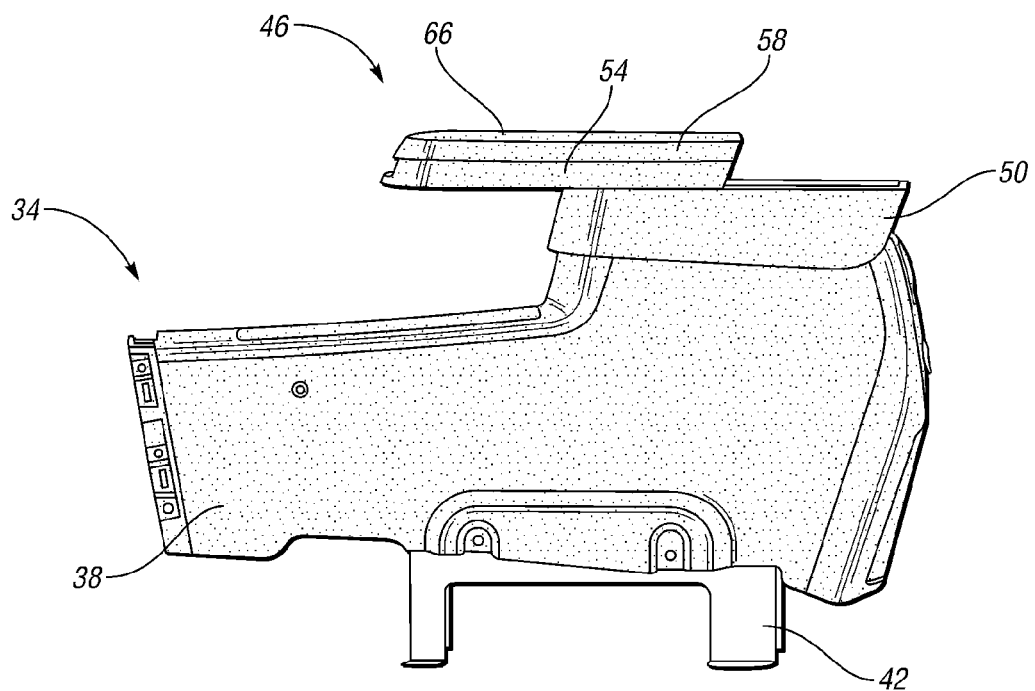
FIG. 9 is a schematic, side view of the console assembly of FIG. 2 with the intermediate member in a forward position that corresponds to the slide assembly in the third configuration.

Referring to FIGS. 8 and 9, a force urging the intermediate member 54 forward also urges the second frame 84 forward. Cross member 90A of the first frame 82 limits forward movement of the carriage assembly 99 along rails 86A, 86B, and the rails 96A, 96B of the second frame 84 slide forwardly through members 106A, 106B. Accordingly, members 106A, 106B guide the intermediate member 54 to a forward position as shown in FIG. 9. The upper member 58 translates with the intermediate member 54 to an intermediate forward position, as shown in FIG. 9. Cross member 98B of the second frame 84 limits forward movement of the intermediate member 54 with respect to the carriage assembly 99.

Referring again to FIGS. 4 and 5, a detent mechanism 120 is operatively connected to the intermediate member 54 and is configured to resist translation of the intermediate member 54 with respect to the lower member 50 from predetermined positions. The detent mechanism 120 is also operatively connected to the upper member 58 through the upper member's connection to the intermediate member 54.

More specifically, the detent mechanism 120 in the embodiment depicted includes a profile member 124 that is mounted with respect to the first frame 82 and the lower member 50. The profile member 124 has an edge 128 that is characterized by a plurality of alternating peaks 132 and valleys 136. Member 108 defines a slot 140. The detent mechanism 120 further includes a member 144 that is engaged with the slot 140 such that the member 144 moves with the carriage assembly 99 in the fore and aft directions, but is selectively slidable with respect to the carriage assembly 99 in the transverse directions (perpendicular to the fore and aft directions).

A spring 148 interconnects the member 144 and the carriage assembly 99, and urges the member 144 into contact with the edge 128 of the profile member 124. Thus, as the intermediate member 54 moves to its aft position, the carriage assembly 99 moves rearward such that the member 144 traverses the peaks 132 and valleys 136 of the edge 128. The spring 148 experiences greater strain when the member 144 contacts a peak 132 than when the member 144 contacts a valley 136; accordingly, the spring 148 resists movement of the member 144 from a valley 136 and thus resists movement of the carriage assembly 99 and the intermediate member 54 from their positions when the member 144 is in a valley 136.

Figure 10:
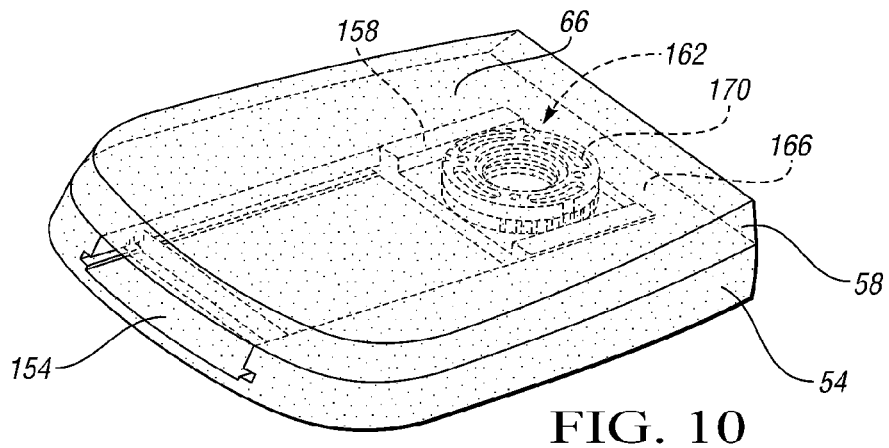
FIG. 10 is a schematic, perspective view of the upper member in a first position relative to the intermediate member.

Referring to FIG. 10, the intermediate member 54 defines a track groove 154. A carriage member 158 is positioned within the track groove 154 such that relative movement of the carriage member 158 with respect to the intermediate member 54 is limited to fore and aft translation. The upper member 58 is mounted to the carriage member 158 by a pivot mechanism 162, and thus the upper member 58 is selectively translatable with the carriage member 158 fore and aft with respect to the intermediate member 54 between a rearward position, as shown in FIG. 10, and a forward position, as shown in FIGS. 11 and 12.

Figure 11:
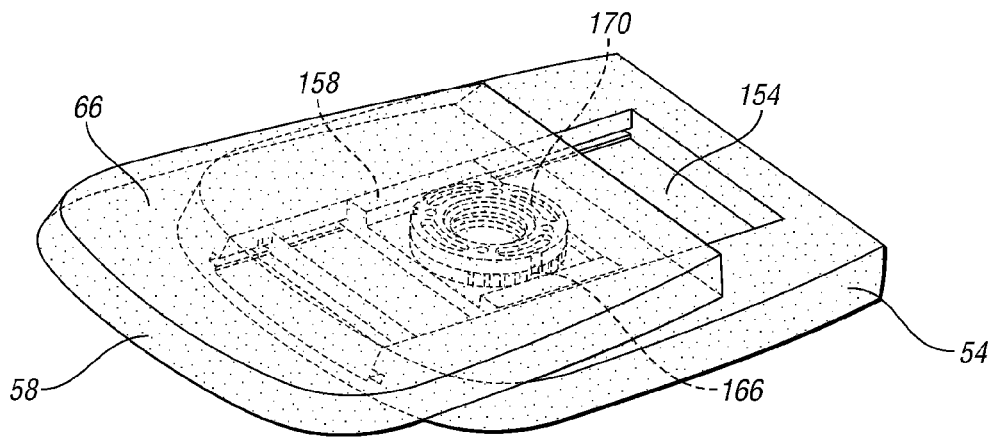
FIG. 11 is a schematic, perspective view of the upper member in a second position relative to the intermediate member.
Figure 12:
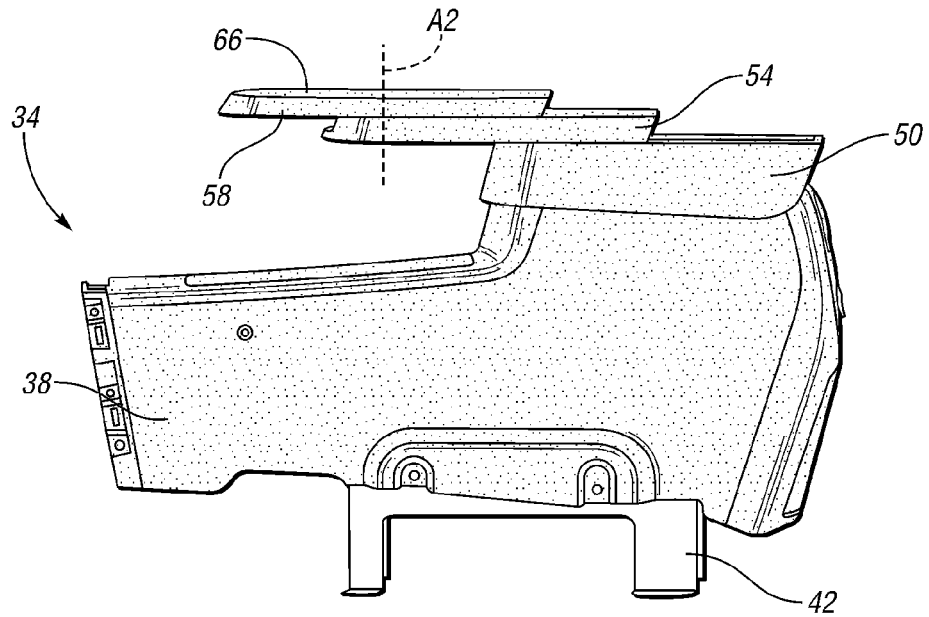
FIG. 12 is a schematic, side view of the console assembly with the intermediate member in its forward position and the upper member in its second position relative to the intermediate member.
Figure 13:
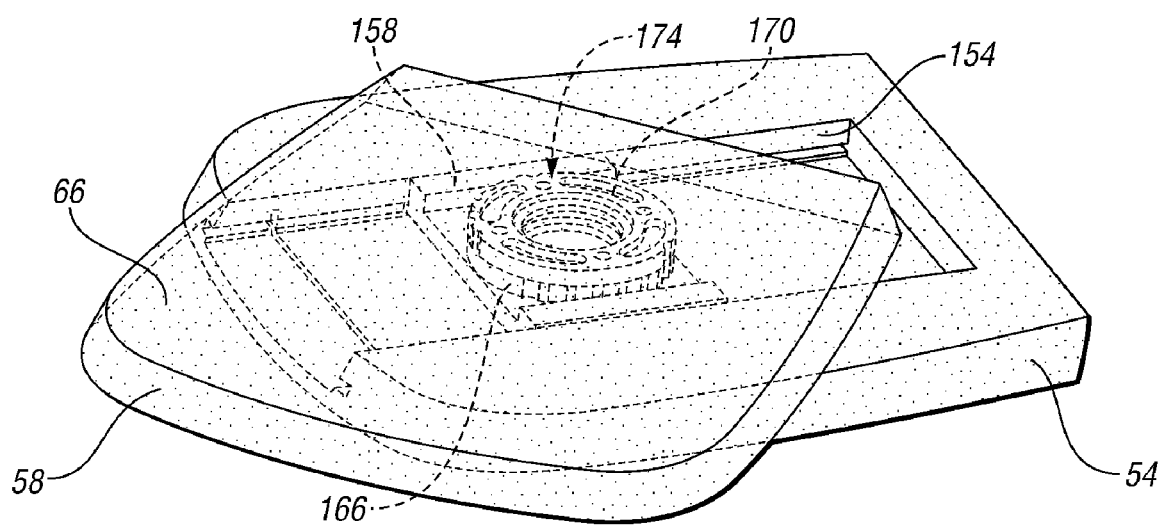
FIG. 13 is a schematic, perspective view of the upper member in a third position relative to the intermediate member.

Referring to FIGS. 11 and 13, the pivot mechanism 162 includes a first member 166 mounted to the carriage member 158 and a second member 170 mounted to the upper member 58. The second member 170 is selectively rotatable with respect to the first member 166 about axis A2, and thus the upper member 58 is selectively rotatable with respect to the intermediate member 54 about axis A2. Axis A2 is generally vertical. A detent mechanism 174 is configured to resist rotation of the upper member 58 from various predetermined positions relative to the intermediate member 54 and the vehicle body.

Referring again to FIG. 1, when the upper member 58 is in its stowed position (as shown in FIG. 2), it is bisected by the centerline of the vehicle body 14. When the lid assembly 46 is in the configuration shown in FIG. 12, the upper member 58 is rotatable at least thirty degrees in a first direction to the position shown at 58B in FIG. 1, and at least thirty degrees in a second direction to the position shown at 58C in FIG. 1. When the upper member 58 is in the position shown at 58B, the upper surface (shown at 66 in FIG. 2) of the upper member 58 is easily accessible to an occupant of the driver seat 22 for use as a work surface. For example, the upper surface 66 may be used to support a book, writing material, a laptop computer, food, etc. Similarly, when the upper member 58 is in the position shown at 58C, the upper surface 66 is easily accessible to an occupant of the front passenger seat 26. When the upper member is in the position shown at 58A, the upper surface 66 is readily accessible for use by occupants of the rear seats 30.

It may be desirable to incorporate an interlock system that prevents movement of the upper member to the positions shown at 58B and 58C unless the vehicle 10 is not in motion. For example, the interlock system may be configured such that the upper member 58 is rotatable only if the ignition switch of the vehicle is in the off position or if the transmission selector is in the "park" position.

While the best modes for carrying out the invention have been described in detail, those familiar with the art to which this invention relates will recognize various alternative designs and embodiments for practicing the invention within the scope of the appended claims.

The invention claimed is:

1. A center console assembly for a vehicle interior compartment comprising:
   a console body defining a storage compartment characterized by an access opening;
   a first member being operatively connected to the console body such that the first member is selectively rotatable about a first axis between a closed position in which the first member obstructs the access opening and an open position in which the first member does not obstruct the access opening; and
   a second member being operatively connected to the first member such that the second member is selectively rotatable with the first member about the first axis, and such that the second member is selectively rotatable with respect to the first member about a second axis;
   wherein the second member is operatively connected to the first member such that the second member is selectively translatable with respect to the first member and the console body.

2. The center console assembly of claim 1, wherein the second axis is substantially perpendicular to the first axis.

3. The center console assembly of claim 1, further comprising a detent mechanism operatively connected to the second member and configured to resist translation of the second member with respect to the first member from predetermined positions.

4. The center console assembly of claim 1, further comprising a third member being operatively connected to the first member such that the third member is selectively translatable with respect to the first member and the console body;
   wherein the second member is operatively connected to the third member such that the second member is selectively translatable with respect to the third member and is selectively rotatable with respect to the third member about the second axis.

5. A vehicle comprising:
   a vehicle body having a floor that partially defines a passenger compartment;
   first and second passenger seats mounted with respect to the floor and being disposed within the passenger compartment;
   a console assembly mounted with respect to the floor and being positioned between the first and second passenger seats;
   said console assembly including a console body and an upper member;
   said upper member being movably mounted with respect to the console body such that the upper member is selectively rotatable with respect to the console body about a generally vertical axis, and is selectively translatable fore and aft with respect to the vehicle body and the console body.

6. The vehicle of claim 5, wherein the console body defines a storage compartment characterized by an access opening;
   wherein the console assembly further includes a lower member being operatively connected to the console body such that the lower member is selectively rotatable with respect to the console body about a generally horizontal axis between a closed position in which the lower member obstructs the access opening and an open position in which the lower member does not obstruct the access opening; and
   wherein the upper member is operatively connected to the lower member such that the upper member is selectively rotatable with the lower member about the generally horizontal axis, and such that the upper member is selectively rotatable with respect to the lower member about the generally vertical axis.

7. The vehicle of claim 6, wherein the upper member is operatively connected to the lower member such that the upper member is selectively translatable fore and aft with respect to the lower member and the console body.

8. The vehicle of claim 7, further comprising a detent mechanism operatively connected to the upper member and configured to resist translation of the upper member with respect to the lower member from predetermined positions.

9. The vehicle of claim 7, further comprising an intermediate member being operatively connected to the lower member such that the intermediate member is selectively translatable with respect to the lower member and the console body;
   wherein the upper member is operatively connected to the intermediate member such that the upper member is selectively movable fore and aft with respect to the intermediate member and is selectively rotatable with respect to the intermediate member about the generally vertical axis.

10. The vehicle of claim 5, wherein the upper member defines a generally horizontal surface that at least partially defines the upper surface of the console assembly.

* * * * *